(12) United States Patent
Zhou

(10) Patent No.: US 11,800,120 B2
(45) Date of Patent: *Oct. 24, 2023

(54) SAMPLE-BASED ANGULAR INTRA-PREDICTION IN VIDEO CODING

(71) Applicant: TEXAS INSTRUMENTS INCORPORATED, Dallas, TX (US)

(72) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,315

(22) Filed: Dec. 10, 2021

(65) Prior Publication Data
US 2022/0103837 A1     Mar. 31, 2022

Related U.S. Application Data

(63) Continuation of application No. 16/838,549, filed on Apr. 2, 2020, now Pat. No. 11,228,771, which is a continuation of application No. 13/658,807, filed on Oct. 23, 2012, now Pat. No. 10,645,398.

(60) Provisional application No. 61/562,906, filed on Nov. 22, 2011, provisional application No. 61/554,144, filed on Nov. 1, 2011, provisional application No. 61/550,990, filed on Oct. 25, 2011.

(51) Int. Cl.
*H04N 19/11* (2014.01)
*H04N 19/157* (2014.01)
*H04N 19/593* (2014.01)
*H04N 19/176* (2014.01)
*H04N 19/59* (2014.01)

(52) U.S. Cl.
CPC ........... *H04N 19/176* (2014.11); *H04N 19/11* (2014.11); *H04N 19/157* (2014.11); *H04N 19/59* (2014.11); *H04N 19/593* (2014.11)

(58) Field of Classification Search
CPC ....... H04N 19/11; H04N 19/59; H04N 19/593
See application file for complete search history.

(56) References Cited

U.S. PATENT DOCUMENTS 8,958,472 B2   2/2015   Kung
8,964,832 B2   2/2015   Chong
(Continued)

OTHER PUBLICATIONS

USPTO Library search; 2023. (Year: 2023).*
(Continued)

*Primary Examiner* — Luis Perez-Fuentes
(74) *Attorney, Agent, or Firm* — Carl G. Peterson; Frank D. Cimino

(57) ABSTRACT

A method for processing a prediction unit (PU) to generate predicted samples is provided that includes computing predicted samples for samples of the PU using sample-based angular intra-prediction (SAP) when lossless coding is enabled for the PU, and computing predicted samples for the samples of the PU using block-based angular intra-prediction when lossless coding is not enabled for the PU. Computation of the predicted using SAP includes determining an intra-prediction angle for the PU, and computing a predicted sample for each sample of the samples in the PU based on linear interpolation of two reference samples adjacent to the sample, wherein the two reference samples are selected according to the intra-prediction angle.

20 Claims, 11 Drawing Sheets

(56) References Cited

U.S. PATENT DOCUMENTS

| | | | |
|---|---|---|---|
| 9,008,175 B2 | 4/2015 | Van Der Auwera | |
| 9,008,179 B2 | 4/2015 | Gao | |
| 9,083,974 B2 | 7/2015 | Jeon | |
| 9,225,986 B2 | 12/2015 | Bossen | |
| 9,451,254 B2 | 9/2016 | Joshi | |
| 9,473,777 B2* | 10/2016 | Kim | H04N 19/593 |
| 9,888,248 B2 | 2/2018 | Song | |
| 9,948,929 B2* | 4/2018 | Gamei | H04N 19/649 |
| 10,645,398 B2* | 5/2020 | Zhou | H04N 19/59 |
| 11,228,771 B2* | 1/2022 | Zhou | H04N 19/11 |
| 2011/0280304 A1 | 11/2011 | Jeon et al. | |
| 2011/0317757 A1 | 12/2011 | Coban | |
| 2012/0008683 A1 | 1/2012 | Karczewicz | |
| 2012/0147955 A1 | 6/2012 | Budagavi | |
| 2012/0183041 A1 | 7/2012 | Maani | |
| 2012/0314767 A1 | 12/2012 | Wang | |
| 2013/0003838 A1 | 1/2013 | Gao | |
| 2013/0101032 A1 | 4/2013 | Whittmann | |
| 2013/0101036 A1 | 4/2013 | Zhou | |
| 2014/0037002 A1 | 2/2014 | Sato | |
| 2014/0341281 A1 | 11/2014 | Bossen | |

OTHER PUBLICATIONS

AHG22—High level signaling of lossless coding mode in HEVC; Zhou; 2011. (Year: 2011).*

High level signaling of lossless coding mode in HEVC; Zhou; 2011. (Year: 2011).*

Shohei Matsuo et al., "Improved Intra Angular Prediction by DCT-Based Interpolation Filter", 20th European Signal Processing Conference (EUSIPCO 2012), pp. 1568-1572, Aug. 27-31, 2012, Bucharest, Romania.

Yung-Lyul Lee et al., "Improved Lossless Intra Coding for H.264/MPEG-4 AVC", IEEE Transactions on Image Processing, vol. 15, No. 9, pp. 2610-2615, Sep. 2006.

"Advanced Video Coding for Generic Audiovisual Services", Series H: Audiovisual and Multimedia Systems, ITU-T Recommendation H.264, Telecommunication Standardization Sector of International Telecommunication Union, pp. 1-680, Jan. 2012.

Minhua Zhou, "AHG13: Sample-Based Angular Intra Prediction for HEVC Lossless Coding", JCTVC-I0117, Joint Collaborative Team on Video Coding (JCT-VC) of ITU-T SG16 WP3 and ISO/IEC JTC1/SC29/WG11, pp. 1-8, Apr. 27-May 7, 2012, Geneva, Switzerland.

Minhua Zhou, "AHG19: Method of Frame-Based Lossless Coding Mode for HEVC", JCTVC-H0083, Joint Collaborative Team on Video Coding (JCT-VC) of ITU-T SG16 WP3 and ISO/IEC JTC1/SC29/WG11, pp. 1-14, Feb. 1-10, 2012, San Jose, CA.

Minhua Zhou, "AHG19: Method of Frame-Based Lossless Coding Mode for HEVC", JCTVC-H0083 presentation, Joint Collaborative Team on Video Coding (JCT-VC) of ITU-T SG16 WP3 and ISO/IEC JTC1/SC29/WG11, pp. 1-9, Feb. 1-10, 2012, San Jose, CA.

Wen Gao et al., "AHG19: A Lossless Coding Solution for HEVC", JCTVC-H0530-r2, Joint Collaborative Team on Video Coding (JCT-VC) of ITU-T SG16 WP3 and ISO/IEC JTC1/SC29/WG11, pp. 1-4, Feb. 1-10, 2012, San Jose, CA.

Keiichi Chono, "AHG22: Cross-Verification of TI's Sample-Based Angular Prediction (SAP) for HEVC Lossless Coding (JCTVC-G093)", JCTVC-G115, Joint Collaborative Team on Video Coding (JCT-VC) of ITU-T SG16 WP3 and ISO/IEC JTC1/SC29/WG11, pp. 1-5, Nov. 21-30, 2011, Geneva, Switzerland.

Minhua Zhou, "AHG22: Sample-Based Angular Prediction (SAP) for HEVC Lossless Coding", JCTVC-G093, Joint Collaborative Team on Video Coding (JCT-VC) of ITU-T SG16 WP3 and ISO/IEC JTC1/SC29/WG11, pp. 1-12, Nov. 19-30, 2011, Geneva, Switzerland.

Wen Gao et al., "A Lossless Coding Solution for HEVC", JCTVC-G664r1, Joint Collaborative Team on Video Coding (JCT-VC) of ITU-T SG16 WP3 and ISO/IEC JTC1/SC29/WG11, pp. 1-13, Nov. 21-30, 2011, Geneva, Switzerland.

Wen Gao et al., "A Lossless Coding Solution for HEVC", JCTVC-G664r1 presentation, Joint Collaborative Team on Video Coding (JCT-VC) of ITU-T SG16 WP3 and ISO/IEC JTC1/SC29/WG11, pp. 1-21, Nov. 21, 2011, Geneva, Switzerland.

Minhua Zhou, "AHG7: Sample-Based Angular Intra Prediction for HEVC Lossless Coding", JCTVC-K0199, Joint Collaborative Team on Video Coding (JCT-VC) of ITU-T SG16 WP3 and ISO/IEC JTC1/SC29/WG11, pp. 1-7, Oct. 10-19, 2012, Shanghai, China.

Minhua Zhou, "Method and System for Lossless Coding Mode in Video Coding", U.S. Appl. No. 13/623,087, filed Sep. 19, 2012, pp. 1-45.

Matsuo, Modification of Intra Prediction in HEVC, 2012 (Year 2012)—in U.S. Appl. No. 13/658,807.

NPL Google Search; 2019; (Year 2019)—in U.S. Appl. No. 13/658,807.

Zhou; AHG22—High Level Signaling Of Losses Coding Mode in HEVC; Nov. 2011, (Year 2011 )—in U.S. Appl. No. 13/658,807.

Zhou; High Level Signaling Of Losses Coding Mode in HEVC; Nov. 2011, (Year 2011)—in U.S. Appl. No. 13/658,807.

Zhou; HEVC Lossless Coding and Improvements; Dec. 2012—in U.S. Appl. No. 13/658,807.

* cited by examiner

SAMPLE-BASED ANGULAR INTRA-PREDICTION IN VIDEO CODING

CROSS-REFERENCE TO RELATED APPLICATIONS

This application is a continuation of U.S. patent application Ser. No. 16/838,549 filed Apr. 2, 2020, which is a continuation of U.S. patent application Ser. No. 13/658,807 filed Oct. 23, 2012, now U.S. Pat. No. 10,645,398, which claims benefit of U.S. Provisional Patent Application Ser. No. 61/550,990 filed Oct. 25, 2011, U.S. Provisional Patent Application Ser. No. 61/554,144 filed Nov. 1, 2011, and U.S. Provisional Patent Application Ser. No. 61/562,906 filed Nov. 22, 2011, all of which are incorporated herein by reference in their entirety.

BACKGROUND OF THE INVENTION

Field of the Invention

Embodiments of the present invention generally relate to angular intra-prediction in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and entropy coding of the transform coefficients.

The above compression process is inherently lossy. While the quantization of the transform coefficients compresses the video by taking advantage of perceptual redundancy in the video, it inevitably introduces quantization errors. In some real world applications, such lossy coding is undesirable. For example, in automotive vision applications, video captured from cameras in a vehicle may need to be transmitted to central processors in a lossless manner for purposes of applying video analytics. In another example, in web collaboration and remote desktop sharing applications where hybrid natural and syntactic video coding might be required, part of the video scene may contain synthetic contents such as presentation slides as well as graphical representation of function keys in a user interface that need to be losslessly coded.

SUMMARY

Embodiments of the present invention relate to methods, apparatus, and computer readable media for sample-based angular intra-prediction in video coding. In one aspect, a method for processing a prediction unit (PU) to generate predicted samples that includes determining an intra-prediction angle for the PU, and computing a predicted sample for a first sample in the PU based on linear interpolation of a first pair of reference samples adjacent to the first sample, wherein the first pair of reference samples is selected according to the intra-prediction angle and the first pair of reference samples are samples in the PU.

In one aspect, a method for processing a prediction unit (PU) to generate predicted samples is provided that includes computing predicted samples for samples of the PU using sample-based angular intra-prediction (SAP) when lossless coding is enabled for the PU, and computing predicted samples for the samples of the PU using block-based angular intra-prediction when lossless coding is not enabled for the PU.

In one aspect, an apparatus configured to process a prediction unit (PU) to generate predicted samples is provided that includes means for computing predicted samples for samples of the PU using sample-based angular intra-prediction (SAP) when lossless coding is enabled for the PU, and means for computing predicted samples for the samples of the PU using block-based angular intra-prediction when lossless coding is not enabled for the PU.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
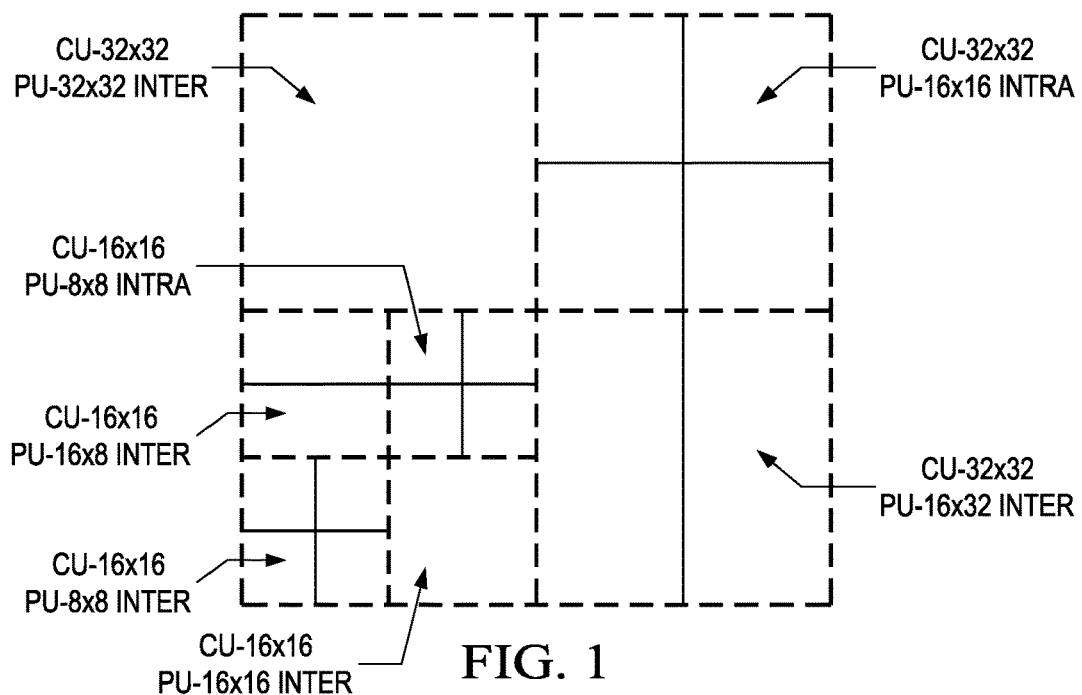
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs. FIG. 1 shows an example of a quadtree based LCU to CU/PU decomposition structure in which the size of the SCU is 16×16 and the size of the LCU is 64×64.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

Some aspects of this disclosure have been presented to the JCT-VC in M. Zhou, "AHG22: Sample-Based Angular Prediction (SAP) for HEVC Lossless Coding," JCTVC-G093, Joint Collaborative Team on Video Coding (JCT-VC) of ITU-T SG16 WP3 and ISO/IEC JTC1/SC29/WG11, Geneva, CH, Nov. 19-30, 2011, M. Zhou, "AHG19: Method of Frame-Based Lossless Coding Mode for HEVC," JCTVC-H0083, Joint Collaborative Team on Video Coding (JCT-VC) of ITU-T SG16 WP3 and ISO/IEC JTC1/SC29/WG11, San Jose, Calif., Feb. 1-10, 2012, and M. Zhou, "AHG7: Sample-Based Angular Prediction for HEVC Lossless Coding," JCTVC-K0199, Joint Collaborative Team on Video Coding (JCT-VC) of ITU-T SG16 WP3 and ISO/IEC JTC1/SC29/WG11, Shanghai, China, Oct. 10-19, 2012, which are incorporated by reference herein in their entirety.

In HEVC Draft 8, lossless coding mode is defined for the HEVC Main profile and is achieved by simply bypassing transform, quantization, and in-loop filters. The lossless coding mode can be turned on or off either for an entire picture or at the individual CU level. More specifically, a high-level flag is defined in the picture parameter set (PPS) to be used to indicate whether lossless coding mode is turned on or off for the picture or pictures referring to the PPS. If this flag is set equal to 1, an additional flag is sent at the CU-level to signal whether or not a CU is coded with lossless mode. If this flag is set equal to 0, CU-level flags are not sent, and all the CUs in the picture are encoded with transform, quantization and loop-filters in the process, which results in some video quality degradation. Thus, to encode an entire picture in the lossless coding mode, the flag in the PPS is set to 1 and a CU-level flag set equal to 1 is signaled for each CU in the picture.

As specified in HEVC draft 8, the same intra-prediction and inter-prediction modes are considered for prediction of CUs for both lossless mode coding and lossy mode coding. There are 35 intra-prediction modes, 33 of which are block-based angular intra-prediction (BAP) modes. Block-based angular intra-prediction (BAP) is defined to exploit spatial sample redundancy in intra-coded CUs. In general, BAP predicts each sample within a PU based on reference samples around the upper and left borders of the PU. The particular two boundary reference samples used for prediction of a sample are selected according to a prediction angle selected for the PU.

Figure 2:
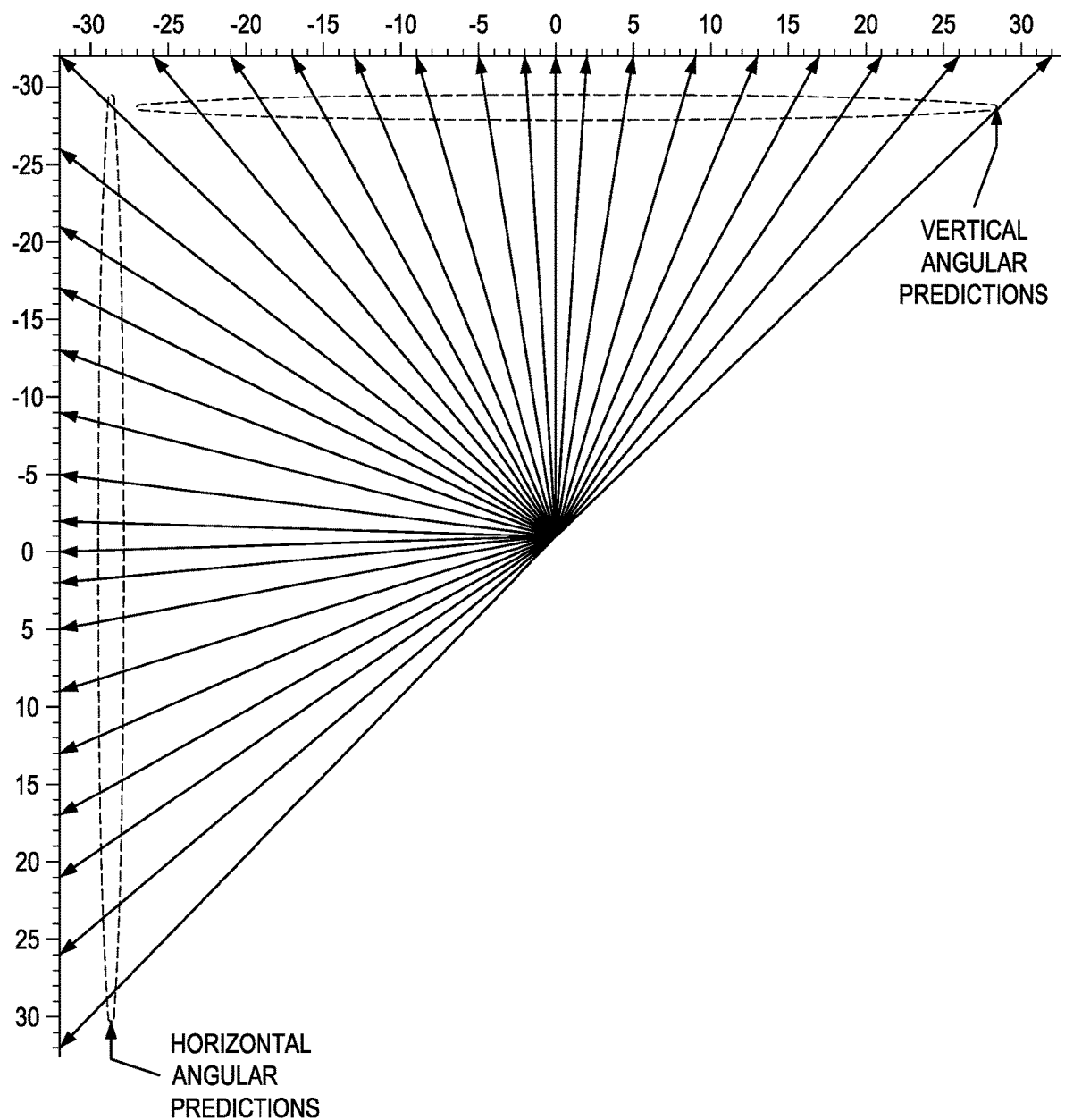
FIG. 2 is an example illustrating prediction angles for angular intra-prediction.

As illustrated in FIG. 2, the 33 angles for the 33 block-based angular intra-prediction modes are +/−[0, 2, 5, 9, 13, 17, 21, 26, 32]/32. The prediction angles are given by the displacement of the bottom row of the PU and the top neighboring reference row above the PU for vertical prediction, or the displacement of the rightmost column of the PU and the left neighboring reference column of the PU for horizontal prediction. Table 1 shows the mode identifier for each of the angular intra-prediction modes and the associated intra-prediction angle. These angles can be categorized into two classes: horizontal and vertical. Modes 2-18 are the horizontal angular intra-prediction modes and modes 19-34 are the vertical angular intra-prediction modes.

TABLE 1

| | Mode | | | | | | | | | | |
|---|---|---|---|---|---|---|---|---|---|---|---|
| | 2 | 3 | 4 | 5 | 6 | 7 | 8 | 9 | 10 | 11 | 12 |
| intraPredAngle | 32 | 26 | 21 | 17 | 13 | 9 | 5 | 2 | 0 | −2 | −5 |

| | Mode | | | | | | | | | | |
|---|---|---|---|---|---|---|---|---|---|---|---|
| | 13 | 14 | 15 | 16 | 17 | 18 | 19 | 20 | 21 | 22 | 23 |
| intraPredAngle | −9 | −13 | −17 | −21 | −26 | −32 | −26 | −21 | −17 | −13 | −9 |

TABLE 1-continued

| | Mode | | | | | | | | | | |
|---|---|---|---|---|---|---|---|---|---|---|---|
| | 24 | 25 | 26 | 27 | 28 | 29 | 30 | 31 | 32 | 33 | 34 |
| intraPredAngle | −5 | −2 | 0 | 2 | 5 | 9 | 13 | 17 | 21 | 26 | 32 |

Figure 3:
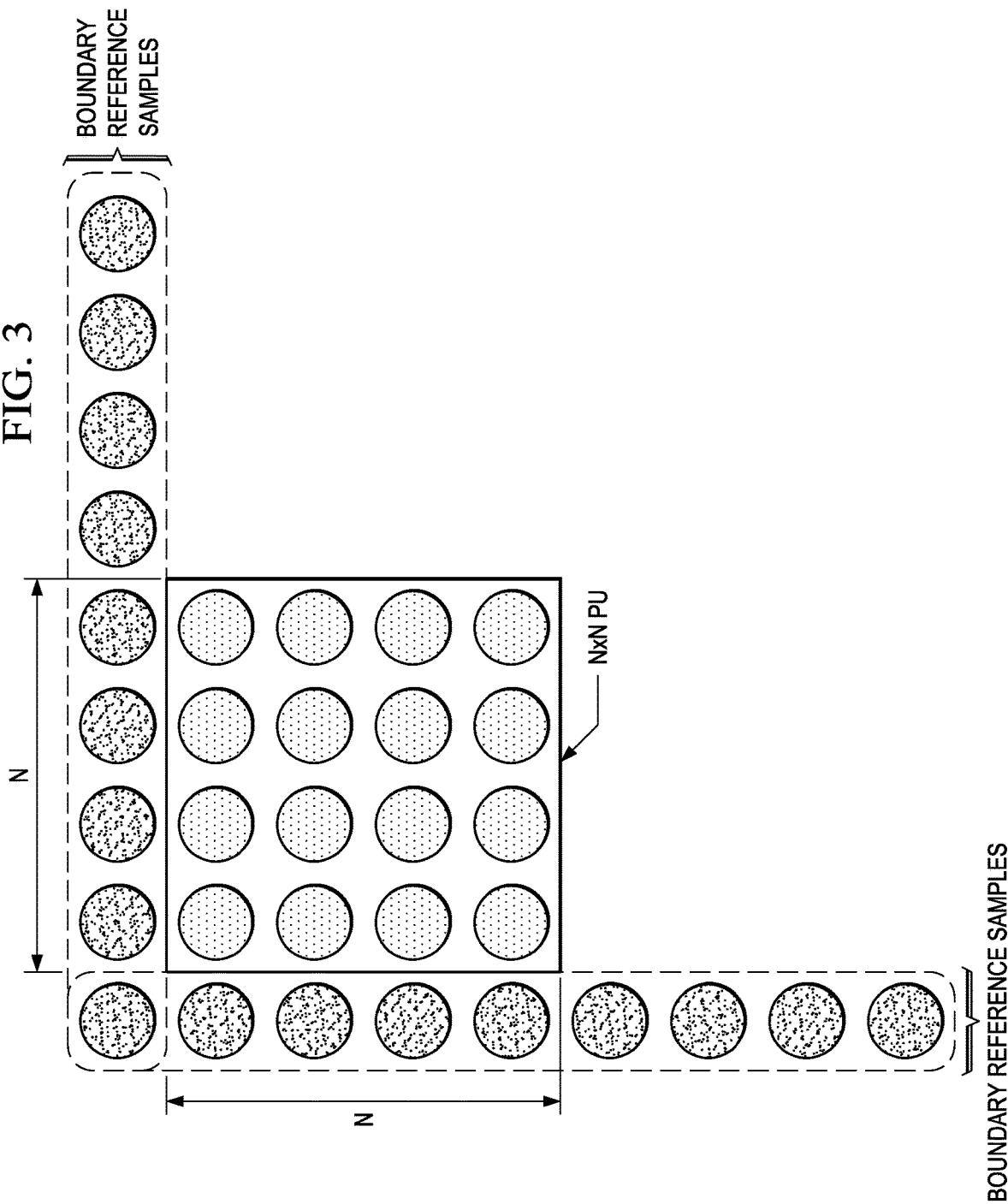
FIG. 3 is an example illustrating reference samples for block-based angular Intra-prediction.
Figure 4:
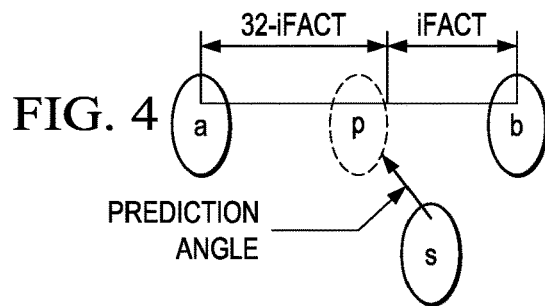
FIG. 4 is an example illustrating computation of a predicted sample using angular intra-prediction.

All samples in a PU of a CU share the same prediction angle. As shown in FIG. 3, for an N×N PU, BAP involves a total of 4N+1 boundary reference samples from left and upper neighboring PUs. Sample substitution is performed to provide values for any unavailable boundary reference samples. FIG. 4 shows a pictorial representation of the computation of a prediction sample for a sample in a PU. For each sample in a PU, two boundary reference samples are selected based on the location of the sample in the PU and the prediction angle. Once the boundary reference samples are determined, the prediction sample is generated using linear interpolation defined as $$p=((32-iFact)*a+iFact*b+16)>>5 \quad (1)$$

where a and b are the boundary reference samples selected for the sample s, p is the prediction sample, and iFact is the distance between p and b. The numerical values 32, 16, and 5 are used since 5-bit precision, i.e., 1/32 pixel precision, is used for representing an intra-prediction angle. If the intra-prediction angle is a vertical angle, $$iFact=((y+1)*intraPredAngle)\& 31 \quad (2)$$

and if the intra-prediction angle is a horizontal angle, $$iFact=((x+1)*intraPredAngle)\& 31 \quad (3)$$

where intraPredAngle is the intra-prediction angle value (see Table 1), and x and y are the coordinates of the sample in the PU for which the prediction sample is to be generated. The upper-left corner sample of the PU has coordinates of x=0 and y=0. Further, if iFact=0, p=a and if iFact=32, p=b.

When a CU is losslessly encoded, samples within a PU as well as reference samples around the upper and left boundaries of a PU can be available to a decoder. This offers the opportunity to use samples within a PU as reference samples to better exploit spatial sample redundancy when lossless coding mode is used. Embodiments of the invention provide for sample-based angular intra-prediction (SAP) of PUs in which the intra-predicted sample for each sample of a PU is generated from two adjacent samples rather than requiring that all intra-predicted samples for samples of a PU be generated from samples from neighboring PUs as in BAP. In SAP, as in BAP, the prediction block is generated sample-by-sample, using the same prediction angle for all samples in a PU.

Figure 5:
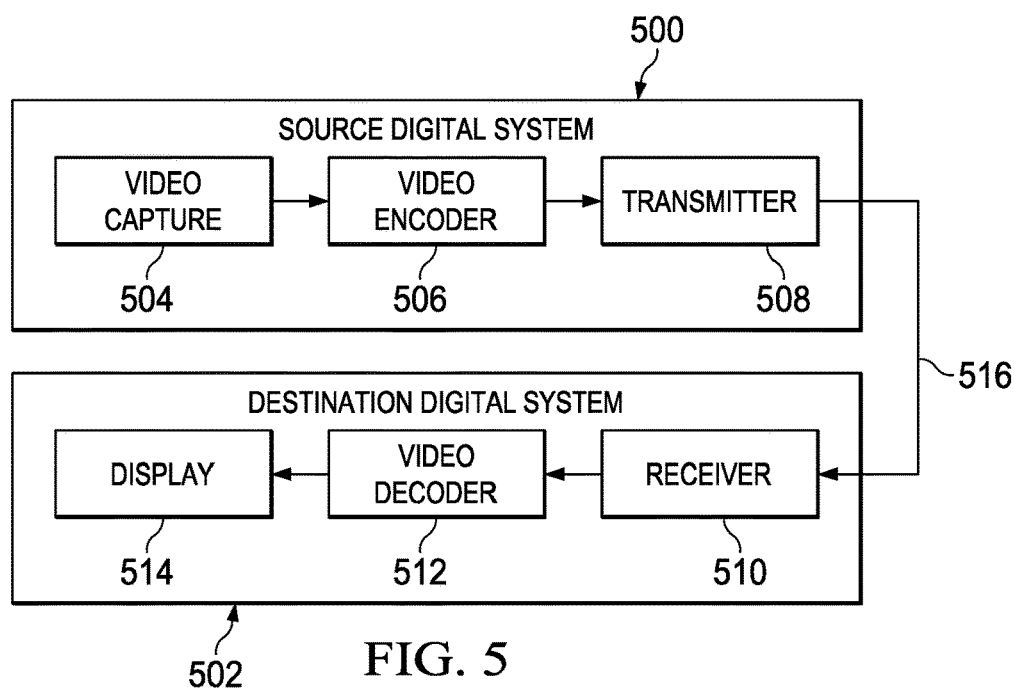
FIG. 5 is a block diagram of a digital system.

FIG. 5 shows a block diagram of a digital system that includes a source digital system 500 that transmits encoded video sequences to a destination digital system 502 via a communication channel 516. The source digital system 500 includes a video capture component 504, a video encoder component 506, and a transmitter component 508. The video capture component 504 is configured to provide a video sequence to be encoded by the video encoder component 506. The video capture component 504 may be, for example, a video camera, a video archive, or a video feed from a video content provider. In some embodiments, the video capture component 504 may generate computer graphics as the video sequence, or a combination of live video, archived video, and/or computer-generated video.

The video encoder component 506 receives a video sequence from the video capture component 504 and encodes it for transmission by the transmitter component 508. The video encoder component 506 receives the video sequence from the video capture component 504 as a sequence of pictures, divides the pictures into largest coding units (LCUs), and encodes the video data in the LCUs. The video encoder component 506 is configured to perform both lossy and lossless encoding of video data in the video sequence during the encoding process. As part of the encoding process, the video encoder component 506 may perform a method for sample-based angular intra-prediction as described herein. An embodiment of the video encoder component 506 is described in more detail herein in reference to FIGS. 6A and 6B.

The transmitter component 508 transmits the encoded video data to the destination digital system 502 via the communication channel 516. The communication channel 516 may be any communication medium, or combination of communication media suitable for transmission of the encoded video sequence, such as, for example, wired or wireless communication media, a local area network, or a wide area network.

The destination digital system 502 includes a receiver component 510, a video decoder component 512 and a display component 514. The receiver component 510 receives the encoded video data from the source digital system 500 via the communication channel 516 and provides the encoded video data to the video decoder component 512 for decoding. The video decoder component 512 reverses the encoding process performed by the video encoder component 506 to reconstruct the LCUs of the video sequence. The video decoder component 512 is configured to decode both lossy and lossless encoded video data in the video sequence as needed during the decoding process. As part of the decoding process, the video decoder component 512 may perform a method for sample-based angular intra-prediction as described herein. An embodiment of the video decoder component 512 is described in more detail below in reference to FIG. 7.

The reconstructed video sequence is displayed on the display component 514. The display component 514 may be any suitable display device such as, for example, a plasma display, a liquid crystal display (LCD), a light emitting diode (LED) display, etc.

In some embodiments, the source digital system 500 may also include a receiver component and a video decoder component and/or the destination digital system 502 may include a transmitter component and a video encoder component for transmission of video sequences both directions for video steaming, video broadcasting, and video telephony. Further, the video encoder component 506 and the video decoder component 512 may perform encoding and decoding in accordance with one or more video compression standards. The video encoder component 506 and the video decoder component 512 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 7:
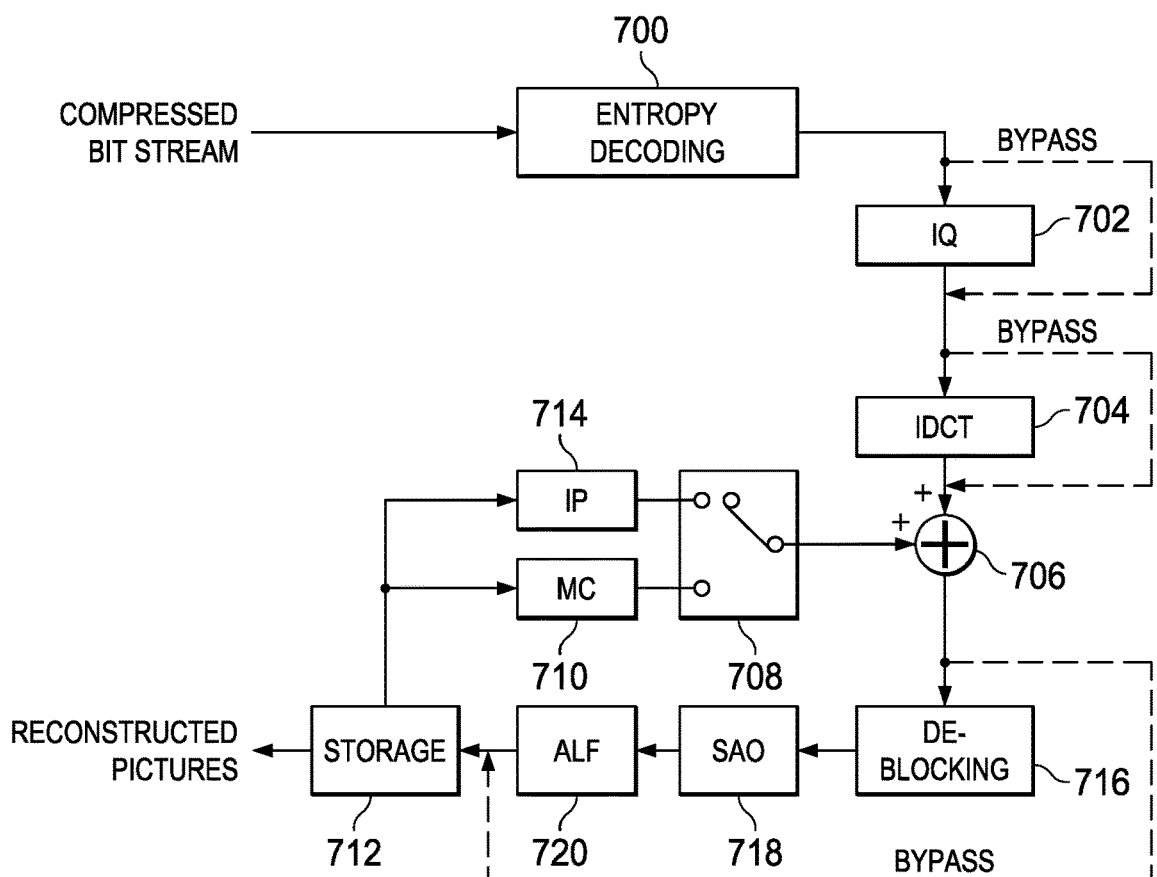
FIG. 7 is a block diagram of a video decoder.
Figure 6A:
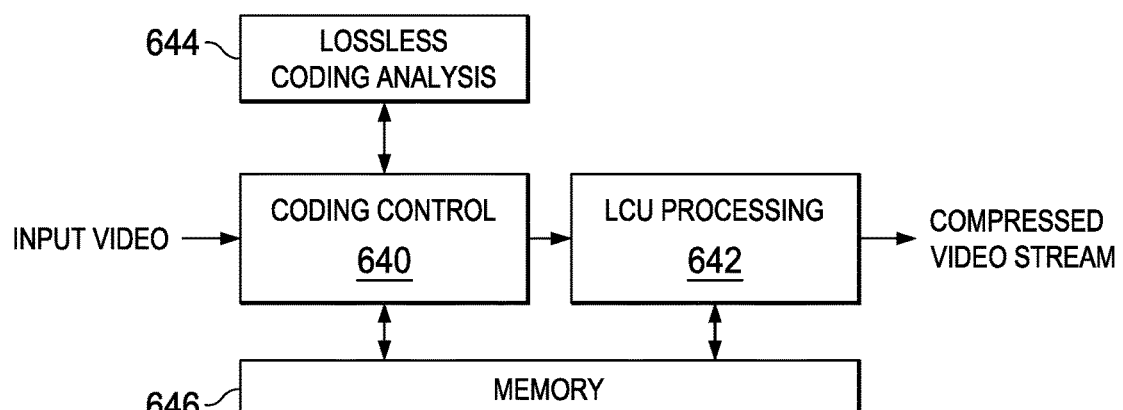
FIGS. 6A and 6B are block diagrams of a video encoder.
Figure 6B:
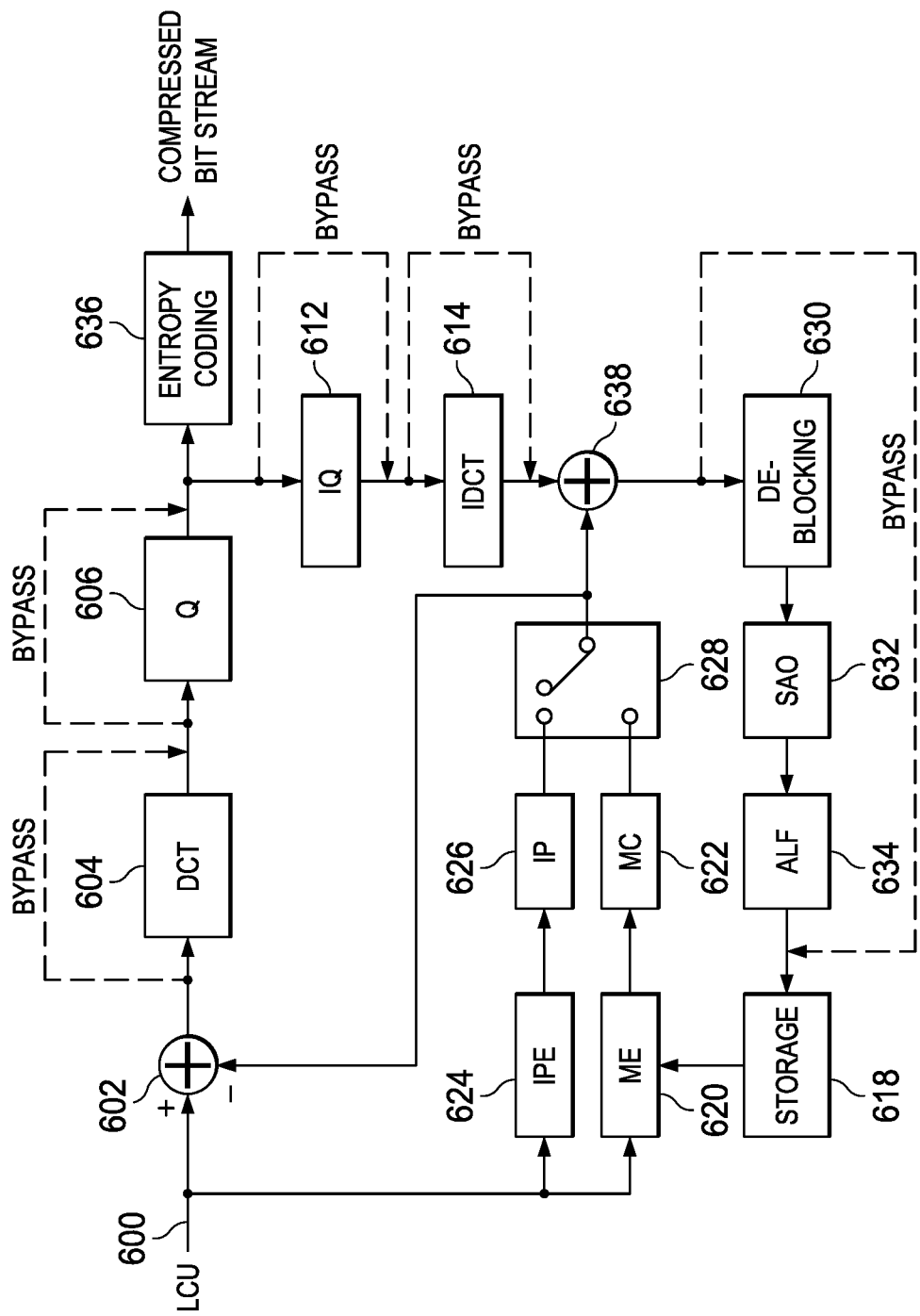

FIGS. 6A and 6B show block diagrams of an example video encoder providing both lossless and lossy encoding of video sequences and signaling the use of lossless and lossy encoding in a compressed video bit stream. FIG. 7 shows a block diagram of an example video decoder providing decoding of video sequences that are lossy encoded, losslessly encoded, or a combination thereof according to signaling in the compressed video bit stream. Any suitable signaling protocol may be used to signal the use of lossless coding. For example, the previously described signaling at the picture and CU level of HEVC draft 8 may be used. Some other suitable techniques for signaling lossless coding are described in U.S. patent application Ser. No. 13/623,087, entitled "Method and System for Lossless Coding Mode in Video Coding, filed Sep. 19, 2012, which is incorporated by reference herein in its entirety.

For simplicity of explanation, the descriptions of the example video encoder and decoder below assume the picture/CU lossless coding signaling protocol of HEVC draft 8. Similarly, for simplicity of explanation, the descriptions also assume the previously described angular intra-prediction modes of HEVC draft 8.

FIG. 6A shows a high level block diagram of the video encoder and FIG. 6B shows a block diagram of the LCU processing component 642 of the video encoder. As shown in FIG. 6A, the video encoder includes a coding control component 640, an LCU processing component 642, a lossless coding analysis component 644, and a memory 646. The memory 646 may be internal (on-chip) memory, external (off-chip) memory, or a combination thereof. The memory 646 may be used to communicate information between the various components of the video encoder.

An input digital video sequence is provided to the coding control component 640. The coding control component 640 sequences the various operations of the video encoder, i.e., the coding control component 640 runs the main control loop for video encoding. For example, the coding control component 640 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component 640 controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The lossless coding analysis component 644 determines what parts of a picture should be losslessly encoded (which may be the entire picture) and provides this information to the coding control component 640 for communication to various components of the LCU processing component 642 as needed. The lossless coding analysis component 644 may use any suitable technique for determining the portions of the picture that should be losslessly encoded. For example, for a video conferencing application, the lossless coding analysis component 644 may use a region of interest algorithm designed to determine those parts of the picture that correspond to synthetic contents, e.g., presentation slides, which should be losslessly encoded. The lossless coding analysis component 644 may communicate the information regarding the parts of a picture to be losslessly encoded in any suitable way. For example, the lossless coding analysis component 644 may specify on an LCU-by-LCU basis whether an entire LCU is to be lossy encoded or some part (which could be all) of the LCU should be losslessly encoded. Some suitable ways in which the lossless coding analysis component 644 may communicate the information regarding the parts of a picture that are to be losslessly encoded, if any, are described in U.S. patent application Ser. No. 13/623,087.

If the lossless coding analysis component 644 indicates that any part of a picture is to be losslessly coded, the coding control component 640 may communicate to the entropy coding component 636 that a flag indicating that lossless coding mode is turned on is to be included in a PPS for that picture. The coding control component 640 may also communicate this condition via memory 646 to the various components of the LCU processing component 642. For example, if the lossless coding analysis component 644 indicates that an entire LCU is to be lossy encoded or some part of the LCU may be losslessly encoded, the coding control component 640 may maintain a coding bit map in memory 646 that is used to indicate this information to the LCU processing component 640 on an LCU by LCU basis. If an entire picture is to be losslessly coded, all bits in the map would be set to indicate lossless coding. Further, for LCUs that are to be partially losslessly encoded, the coding control component 640 may communicate what region(s) are to be losslessly encoded.

FIG. 6B shows a block diagram of the LCU processing component 642. The LCU processing receives LCUs 600 of the input video sequence from the coding control component 640 and encodes the LCUs 600 under the control of the coding control component 640 to generate the compressed video stream. The LCUs 600 in each picture are processed in row order. The LCU processing component 642 is configured such that the components that introduce coding loss may be bypassed as needed to provide lossless encoding of CUs. More specifically, as indicated in FIG. 6B, the transform component (DCT) 604 and the quantize component (Q) 606 may be bypassed. Further, the inverse quantize component (IQ) 612 and the inverse transform component 614 (IDCT) may be bypassed as transformation and quantization are not performed. In addition, the in-loop filtering components 630, 632, 634 may be bypassed as the filtering is performed to compensate for artifacts introduced by lossy coding and may also introduce additional coding errors.

The LCUs 600 from the coding control component 640 are provided as one input of a motion estimation component (ME) 620, as one input of an intra-prediction estimation component (IPE) 624, and to a positive input of a combiner 602 (e.g., adder or subtractor or the like). Further, although not specifically shown, the prediction mode of each picture as selected by the coding control component 640 is provided to a mode decision component 628 and the entropy coding component 636.

The storage component 618 provides reference data to the motion estimation component 620 and to the motion compensation component 622. The reference data may include one or more previously encoded and decoded pictures, i.e., reference pictures.

The motion estimation component 620 provides motion data information to the motion compensation component 622 and the entropy coding component 636. More specifically, the motion estimation component 620 performs tests on CUs in an LCU based on multiple inter-prediction modes (e.g., skip mode, merge mode, and normal or direct inter-prediction), PU sizes, and TU sizes using reference picture data from storage 618 to choose the best CU partitioning, PU/TU partitioning, inter-prediction modes, motion vectors, etc. based on coding cost, e.g., a rate distortion coding cost. To perform the tests, the motion estimation component 620 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 620 provides the motion vector (MV) or vectors and the prediction mode for each PU in the selected CU partitioning to the motion compensation component (MC) 622. When lossless coding is enabled for the current picture, a flag for each CU in the selected CU partitioning is also provided to the motion compensation component 622, the flag indicating whether the CU is to be lossy or losslessly encoded.

When the coding control component 640 indicates that part of an LCU is to be losslessly encoded, the CU/PU/TU decomposition of an LCU by the motion estimation component 620 includes consideration of the region or regions of the LCU that are to be losslessly encoded. For example, when the motion estimation component 620 is considering options for LCU to CU partitioning, modifications to the partitioning may be made based on cost and the information regarding the region or regions to be losslessly encoded to determine a CU partitioning that best covers the region or regions indicated with minimum inclusion of samples from regions that can be lossy coded.

The motion compensation component 622 receives the selected inter-prediction mode and mode-related information from the motion estimation component 620 and generates the inter-predicted CUs. When lossless coding is enabled for the current picture, the motion compensation component 622 also receives the coding mode flags for the CUs. The inter-predicted CUs are provided to the mode decision component 628 along with the selected inter-prediction modes for the inter-predicted PUs and corresponding TU sizes for the selected CU/PU/TU partitioning. The coding costs of the inter-predicted CUs are also provided to the mode decision component 628.

The intra-prediction estimation component 624 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 624 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 624 provides the selected intra-prediction modes for the PUs, and the corresponding TU sizes for the selected CU partitioning to the intra-prediction component (IP) 626. The coding costs of the intra-predicted CUs are also provided to the intra-prediction component 626. When lossless coding is enabled for the current picture, a flag for each CU in the selected CU partitioning is also provided to the intra-prediction component 626, the flag indicating whether the CU is to be lossy or losslessly encoded.

When lossless coding is enabled for the current picture and the coding control component 640 indicates that part of an LCU is to be losslessly encoded, the CU/PU/TU decomposition of an LCU by the intra-prediction estimation component 624 includes consideration of the region or regions of the LCU that are to be losslessly encoded. For example, when the intra-prediction estimation component 624 is considering options for LCU to CU partitioning, modifications to the partitioning may be made based on cost and the information regarding the region or regions to be losslessly encoded to determine a CU partitioning that best covers the region or regions indicated with minimum inclusion of samples from regions that can be lossy coded.

The intra-prediction modes tested the intra-prediction estimation component 624 include one or more of the angular intra-prediction modes. For lossy coded CUs, the angular intra-prediction modes are tested using block-based angular intra-prediction (BAP) as previously described. For losslessly coded CUs, the angular intra-prediction modes are tested using sample-based angular intra-prediction (SAP). The same mode/angle definitions and linear interpolation are used for both BAP and SAP, as is the linear interpolation of the reference samples to generate a predicted sample. However, as is described in more detail below herein, the reference samples used for SAP differ from those used for BAP. A method for SAP that may be used by the intra-prediction estimation component 624 is described herein.

The intra-prediction component 626 (IP) receives intra-prediction information, e.g., the selected mode or modes for the PU(s), the PU size, etc., from the intra-prediction estimation component 624 and generates the intra-predicted CUs. When lossless coding is enabled for the current picture, the intra-prediction component 626 also receives the coding mode flags for the CUs. If the selected mode for a PU is an angular intra-prediction mode and the CU is to be lossy coded, the intra-prediction component 626 generates the predicted sample block for the PU using BAP. If the selected mode for a PU is an angular intra-prediction mode and the CU is to be losslessly coded, the intra-prediction component 626 generates the predicted sample block for the PU using SAP. A method for SAP that may be used by the intra-prediction component 626 is described herein. The intra-predicted CUs are provided to the mode decision component 628 along with the selected intra-prediction modes for the intra-predicted PUs and corresponding TU sizes for the selected CU/PU/TU partitioning. The coding costs of the intra-predicted CUs are also provided to the mode decision component 628.

The mode decision component 628 selects between intra-prediction of a CU and inter-prediction of a CU based on the intra-prediction coding cost of the CU from the intra-prediction component 626, the inter-prediction coding cost of the CU from the motion compensation component 622, and the picture prediction mode provided by the coding control component 640. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 636. When lossless coding is enabled for the current picture, the coding mode flags for the CUs also provided to the entropy coding component 636.

The output of the mode decision component 628, i.e., the predicted PUs, is provided to a negative input of the combiner 602 and to the combiner 638. The associated transform unit size is also provided to the transform component 604. The combiner 602 subtracts a predicted PU from the original PU. Each resulting residual PU is a set of pixel difference values that quantify differences between pixel values of the original PU and the predicted PU. The residual blocks of all the PUs of a CU form a residual CU for further processing.

For CUs to be lossy encoded, the transform component 604 performs block transforms on the residual CUs to convert the residual pixel values to transform coefficients and provides the transform coefficients to a quantize component 606. More specifically, the transform component 604 receives the transform unit sizes for the residual CU and applies transforms of the specified sizes to the CU to generate transform coefficients. Further, the quantize component 606 quantizes the transform coefficients based on quantization parameters (QPs) and quantization matrices provided by the coding control component 640 and the transform sizes and provides the quantized transform coefficients to the entropy coding component 636 for coding in the bit stream.

For CUs to be losslessly encoded, the transform component 604 and the quantize component 606 are bypassed and the residual values are provided to the entropy coding component 636 for coding in the bit stream.

The entropy coding component 636 entropy encodes the relevant data, i.e., syntax elements, output by the various encoding components and the coding control component 640 to generate the compressed video bit stream. Among the syntax elements that are encoded are picture parameter sets, flags indicating the CU/PU/TU partitioning of an LCU, the prediction modes for the CUs, CU-level lossy/lossless encoding flags (when lossless encoding is turned on for a picture), and the quantized transform coefficients (for lossy encoding) or residual pixel values (for lossless encoding) for the CUs. The entropy coding component 636 also codes relevant data such as ALF parameters, e.g., filter type, on/off flags, and filter coefficients, and SAO parameters, e.g., filter type, on/off flags, and offsets if these components are not bypassed.

The LCU processing component 642 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

For lossy encoded CUs, the quantized transform coefficients for each CU are provided to an inverse quantize component (IQ) 612, which outputs a reconstructed version of the transform result from the transform component 604. The dequantized transform coefficients are provided to the inverse transform component (IDCT) 614, which outputs estimated residual information representing a reconstructed version of a residual CU. The inverse transform component 614 receives the transform unit size used to generate the transform coefficients and applies inverse transform(s) of the specified size to the transform coefficients to reconstruct the residual values. The reconstructed residual CU is provided to the combiner 638.

For losslessly encoded CUs, the inverse quantize component 612 and the inverse transform component 614 are bypassed and the residual CUs are provided to the combiner 638.

The combiner 638 adds the original predicted CU to the residual CU to generate a reconstructed CU, which becomes part of reconstructed picture data. The reconstructed picture data is stored in a buffer (not shown) for use by the intra-prediction estimation component 624.

Various in-loop filters may be applied to the reconstructed lossy coded picture data to improve the quality of the reference picture data used for encoding/decoding of subsequent pictures. The in-loop filters may include a deblocking filter 630, a sample adaptive offset filter (SAO) 632, and an adaptive loop filter (ALF) 634. In some embodiments, the ALF 634 may not be present. In general, the deblocking filter 630 operates to smooth discontinuities at block boundaries, i.e., TU and CU block boundaries, in a reconstructed picture. In general, the SAO filter 632 determines the best offset values, i.e., band offset values or edge offset values, to be added to pixels of a reconstructed picture to compensate for intensity shift that may have occurred during the block based coding of the picture and applies the offset values to the reconstructed picture. In general, the ALF 634 implements an adaptive Wiener filtering technique to minimize distortion in the reconstructed picture as compared to the original picture.

The various in-loop filters may be applied on an LCU-by-LCU basis. When lossless coding mode is not enabled for a picture, the in-loop 630, 632, 634 are applied to each reconstructed LCU in the picture and the final filtered reference picture data is provided to the storage component 618. When lossless coding mode is enabled for a picture, the in-loop filters 630, 632, 634 is applied to those parts of a reconstructed LCU that were lossy encoded and bypassed for parts that were losslessly encoded and the final reference picture data is provided to the storage component 618. For application of the deblocking filter 630 along boundary edges between lossy and losslessly coded blocks, samples on the lossy coded block side may be filtered while samples on the losslessly coded block side are not filtered. The deblocking filter process (i.e., filter on/off decision and strong/weak filtering) is unchanged.

Referring now to the example video decoder of FIG. 7, the video decoder is configured to bypass certain components as needed, i.e., the inverse quantize component 702, the inverse transformation component 704, and the filtering components 716, 718, 720 when lossless coding is signaled. The video decoder operates to reverse the encoding operations, i.e., entropy coding, quantization, transformation, and prediction, performed by the video encoder of FIG. 7 to regenerate the pictures of the original video sequence. In view of the above description of a video encoder, one of ordinary skill in the art will understand the functionality of components of the video decoder without need for detailed explanation.

The entropy decoding component 700 receives an entropy encoded (compressed) video bit stream and reverses the entropy coding to recover the encoded syntax elements, e.g., CU, PU, and TU structures of LCUs, quantized transform coefficients (for lossy coding) and/or residual sample values (for lossless coding) for CUs, motion vectors, prediction modes, lossless coding flags (if present), etc. The decoded syntax elements are passed to the various components of the decoder as needed. For example, decoded prediction modes are provided to the intra-prediction component (IP) 714 or motion compensation component (MC) 710. If the decoded prediction mode is an inter-prediction mode, the entropy decoder 700 reconstructs the motion vector(s) as needed and provides the motion vector(s) to the motion compensation component 710.

If the entropy decoding component 700 decodes a lossless coding enabled flag in a PPS of the bit stream that indicates that lossless coding mode is enabled for a picture or pictures in the bit stream referring to the PPS, the entropy decoding component 700 manages the decoding of the picture or pictures according to the CU coding mode flags in the bit stream. More specifically, the entropy decoding component 700 causes the inverse quantize component 702 and the inverse transform component 704 to be bypassed for any losslessly coded CUs, providing the entropy decoded residual CUs directly to the addition component 706. The in-loop filtering components 716, 718, 720 are also bypassed for these CUs. For the lossy coded CUs, the entropy decoding component 700 provides the entropy decoded quantized transform coefficients of the CUs to the inverse quantize component 702. Also, the in-loop filtering components 716, 718, 720 are not bypassed for these CUs.

The inverse quantize component (IQ) 702 de-quantizes the quantized transform coefficients of lossy coded CUs. The inverse transform component 704 transforms the frequency domain data from the inverse quantize component 702 back to the residual CUs. That is, the inverse transform component 704 applies an inverse unit transform, i.e., the inverse of the unit transform used for encoding, to the de-quantized residual coefficients to produce reconstructed residual values of the CUs.

A residual CU supplies one input of the addition component 706. The other input of the addition component 706 comes from the mode switch 708. When an inter-prediction mode is signaled in the encoded video stream, the mode switch 708 selects predicted PUs from the motion compensation component 710 and when an intra-prediction mode is signaled, the mode switch selects predicted PUs from the intra-prediction component 714.

The motion compensation component 710 receives reference data from the storage component 712 and applies the motion compensation computed by the encoder and transmitted in the encoded video bit stream to the reference data to generate a predicted PU. That is, the motion compensation component 710 uses the motion vector(s) from the entropy decoder 700 and the reference data to generate a predicted PU.

The intra-prediction component 714 receives reconstructed samples from previously reconstructed PUs of a current picture from the storage component 712 and performs the intra-prediction computed by the encoder as signaled by an intra-prediction mode transmitted in the encoded video bit stream using the reconstructed samples as needed to generate a predicted PU. The intra-prediction component 714 also receives the decoded residual samples of losslessly encoded CUs for use in SAP. If the signaled mode for a PU is an angular intra-prediction mode and the CU of the current PU is lossy encoded, the intra-prediction component 714 generates the predicted sample block for the PU using BAP. If the selected mode for a PU is an angular intra-prediction mode and the CU of the current PU is losslessly encoded, the intra-prediction component 714 generates the predicted sample block for the PU using SAP. A method for SAP that may be used by the intra-prediction component 714 is described herein.

The addition component 706 generates a reconstructed CU by adding the predicted PUs selected by the mode switch 708 and the residual CU. The output of the addition component 706, i.e., the reconstructed CUs, is stored in the storage component 712 for use by the intra-prediction component 714.

In-loop filters may be applied to reconstructed lossy coded picture data to improve the quality of the decoded pictures and the quality of the reference picture data used for decoding of subsequent pictures. The in-loop filters are the same as those of the encoder, i.e., a deblocking filter 716, a sample adaptive offset filter (SAO) 718, and an adaptive loop filter (ALF) 720. In some embodiments, the ALF 720 may not be present. The in-loop filters may be applied on an LCU-by-LCU basis. When lossless coding is not enabled for a picture, the in-loop filters 716, 718, 720 are applied to each reconstructed LCU in the picture and the final filtered reference picture data is provided to the storage component 712. When lossless coding is enabled for a picture, the in-loop filters 716, 718, 720 is applied to those parts of a reconstructed LCU that were lossy encoded and bypassed for parts that were losslessly encoded and the final reference picture data is provided to the storage component 712. For application of the deblocking filter 716 along boundary edges between lossy and losslessly coded blocks, samples on the lossy coded block side may be filtered while samples on the losslessly coded block side are not filtered. The deblocking filter process (i.e., filter on/off decision and strong/weak filtering) is unchanged.

Figure 8:
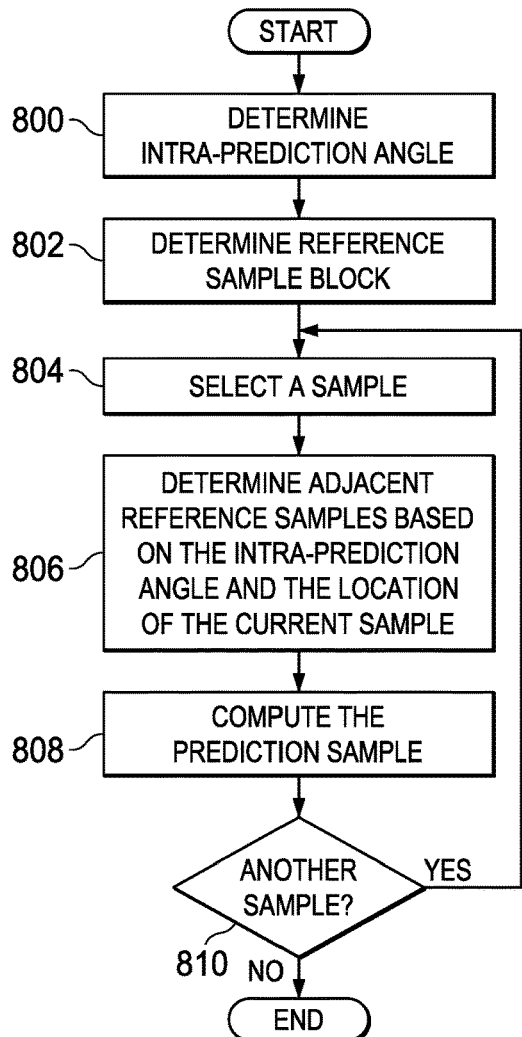
FIGS. 8 and 11 are flow diagrams of sample-based angular intra-prediction (SAP) methods.
Figure 11:
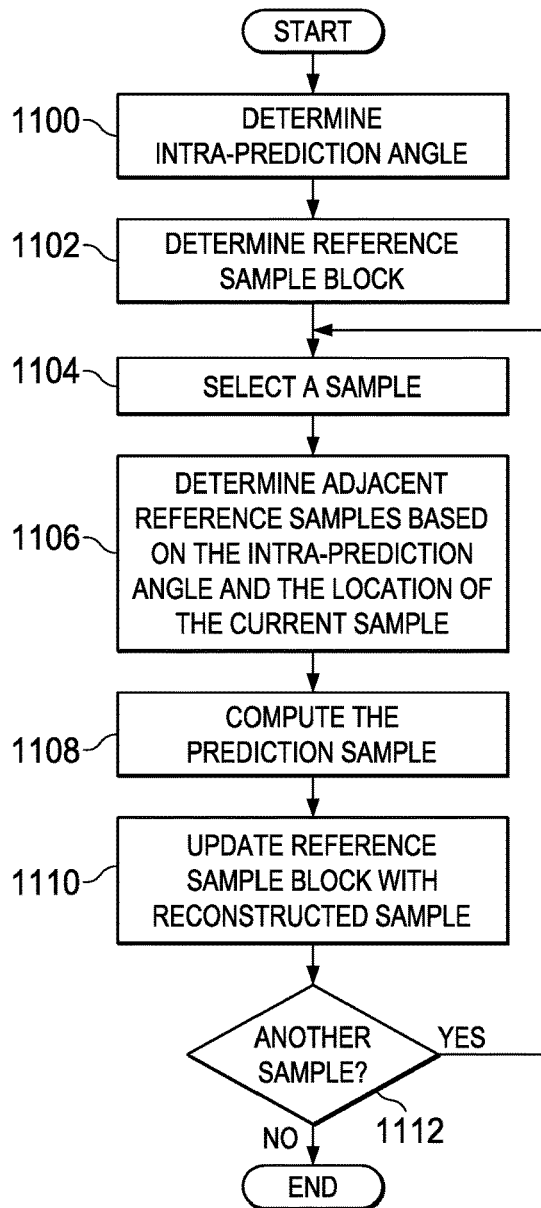

FIGS. 8 and 11 are flow diagrams of methods for sample-adaptive angular intra-prediction (SAP) of a PU that may be performed, respectively, in a video encoder and video decoder when lossless coding is enabled for a CU including the PU. These methods may be used for both luminance and chrominance components of a PU. For simplicity of explanation, the descriptions of these methods assume the previously described angular intra-prediction modes of HEVC draft 8. In a video encoder, the method of FIG. 8 may be used during intra-prediction estimation in the selection of intra-prediction modes for PUs and for generation of the predicted sample block of a PU when an angular intra-prediction mode is selected for the PU. In a video decoder, the method of FIG. 11 may be used when lossless encoding is signaled in the compressed bit stream for the CU including the PU and an angular intra-prediction mode is signaled for the PU in the compressed bit stream.

In general, for SAP, a predicted sample for a sample in a PU is generated by linear interpolation of two reference samples adjacent to the sample. The two adjacent samples are selected according to the intra-prediction angle. Depending on the location of the sample, a reference sample may be an adjacent sample in the PU, may be an adjacent reconstructed sample (boundary sample) from a top or left neighboring PU (padded as needed for unavailable neighboring samples), or may be a padded sample representing an adjacent sample from a right or bottom neighboring PU. FIGS. 10A-10D illustrate the reference samples for SAP for an N×N PU. The reference samples are made up of samples from the N×N PU samples, 2N+3 boundary reference samples, and N−1 padded reference samples. Specifically, FIG. 10A-10D illustrate, respectively, reference samples and sample prediction for negative vertical intra-prediction angles, negative horizontal intra-prediction angles, positive vertical intra-prediction angles, and positive horizontal intra-prediction angles.

Referring now to FIG. 8, initially, an angular intra-prediction angle is determined 800 for the PU. For example, during intra-prediction estimation, the angular intra-prediction angle may be determined by selecting one of the available angular intra-prediction modes for testing and determining the corresponding angle. The intra-prediction estimation process may, for example, iterate through the angular intra-prediction modes of Table 1, selecting each one in turn for testing. Further, the intra-prediction estimation process determines the intra-prediction mode to be used for generating the predicted of a PU, which may be one of the angular intra-prediction modes. When the intra-prediction estimation process selects an angular intra-prediction mode, the intra-prediction block generation process may, for example, determine the corresponding angle from a look up table such as that of Table 1.

Figure 10A:
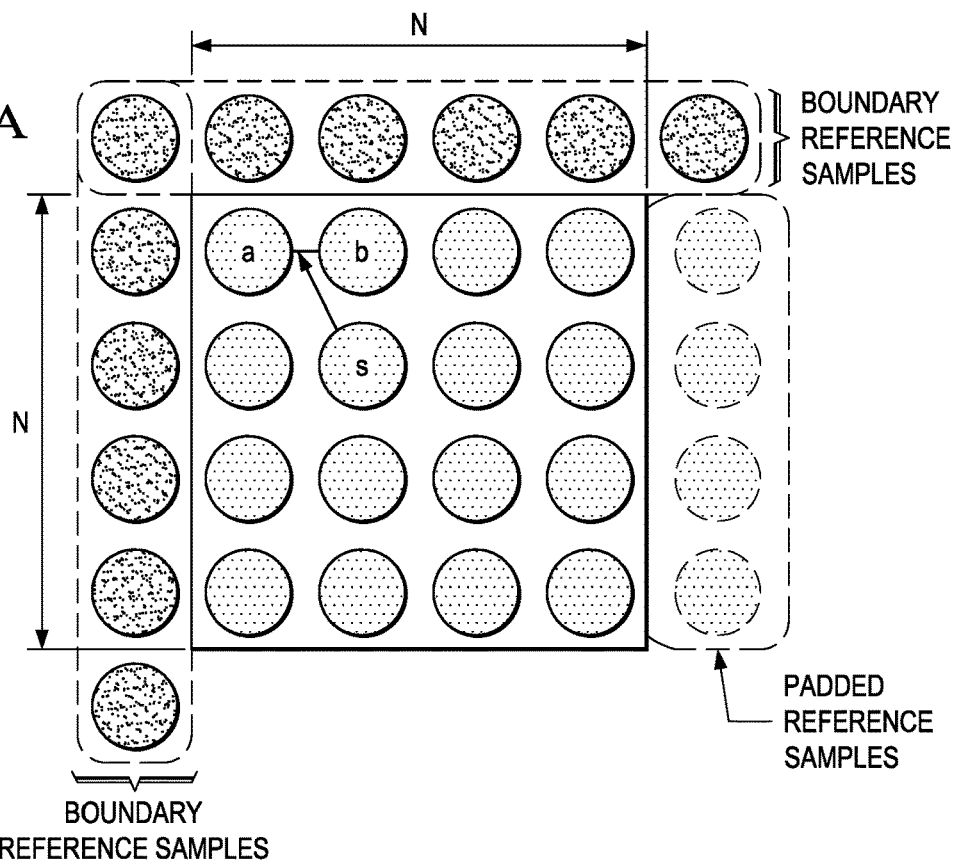
FIGS. 10A-10D are examples illustrating reference samples and sample prediction for various intra-prediction angle orientations.
Figure 10B:
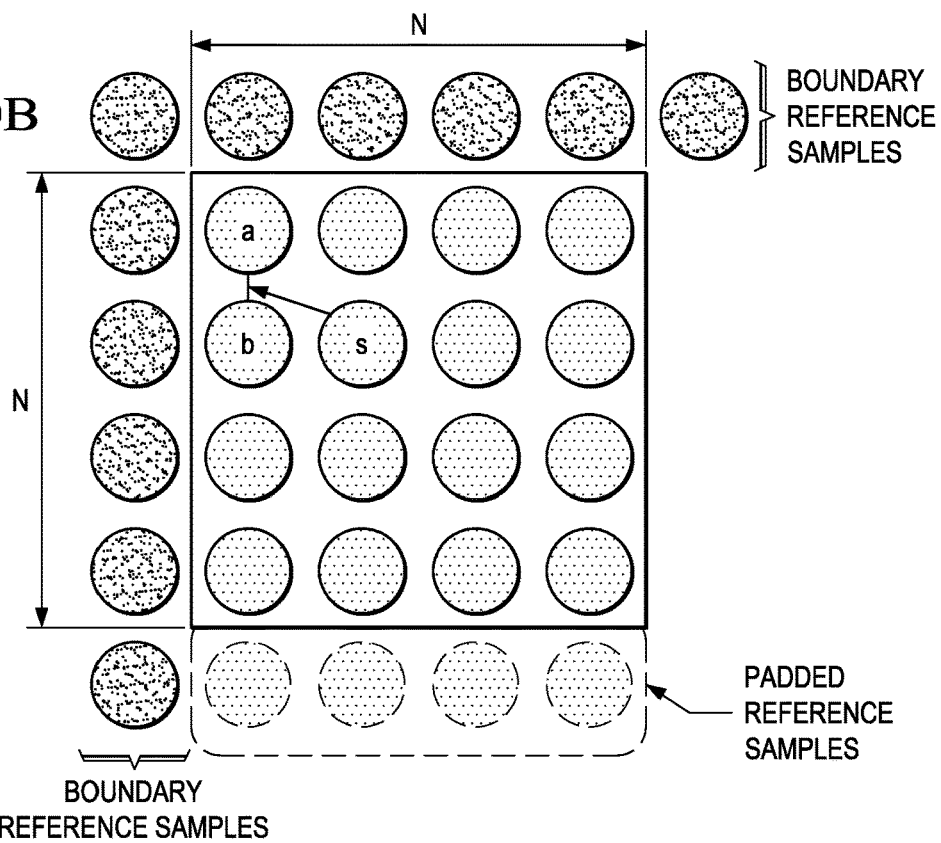
Figure 10C:
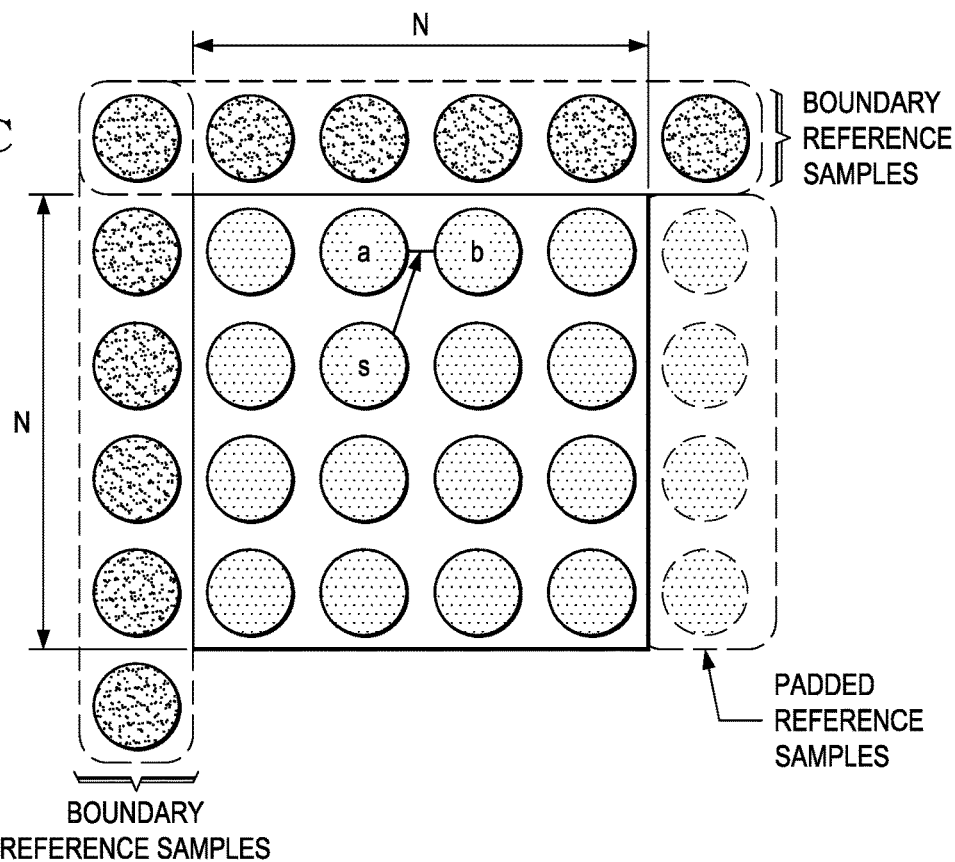
Figure 10D:
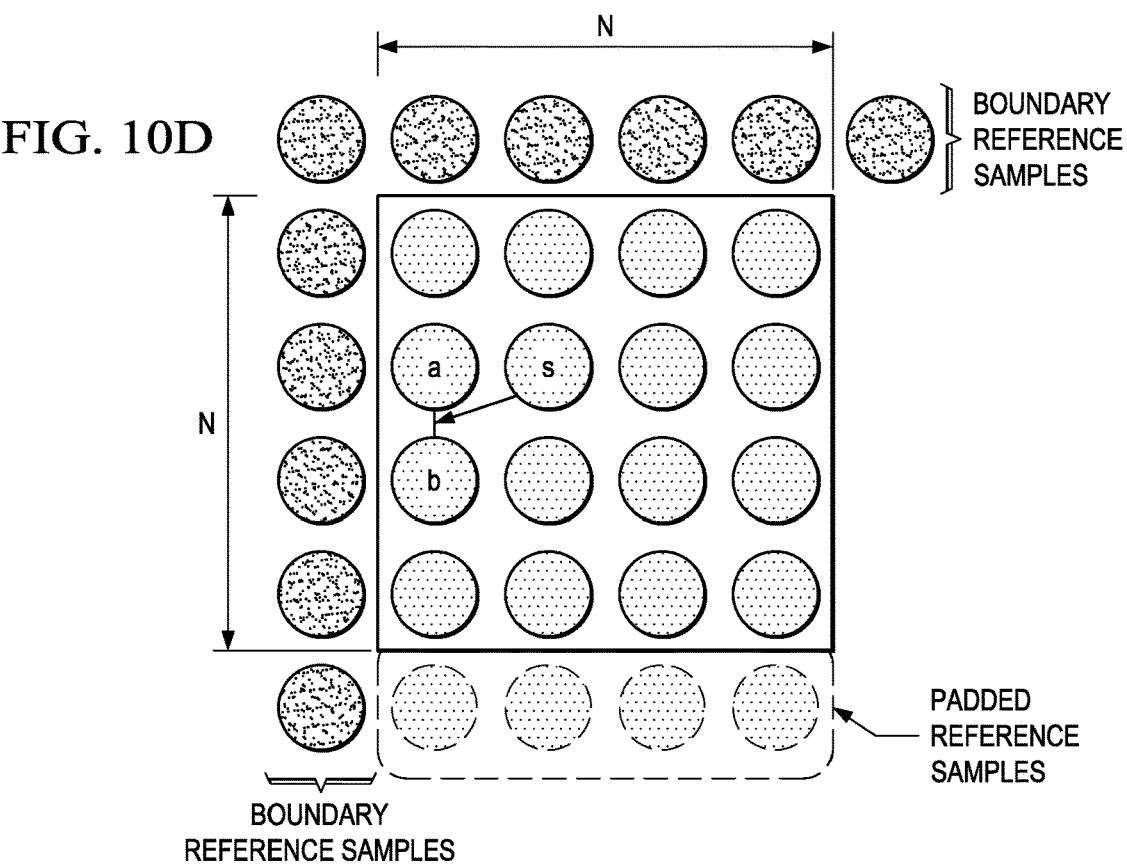
Figure 10E:
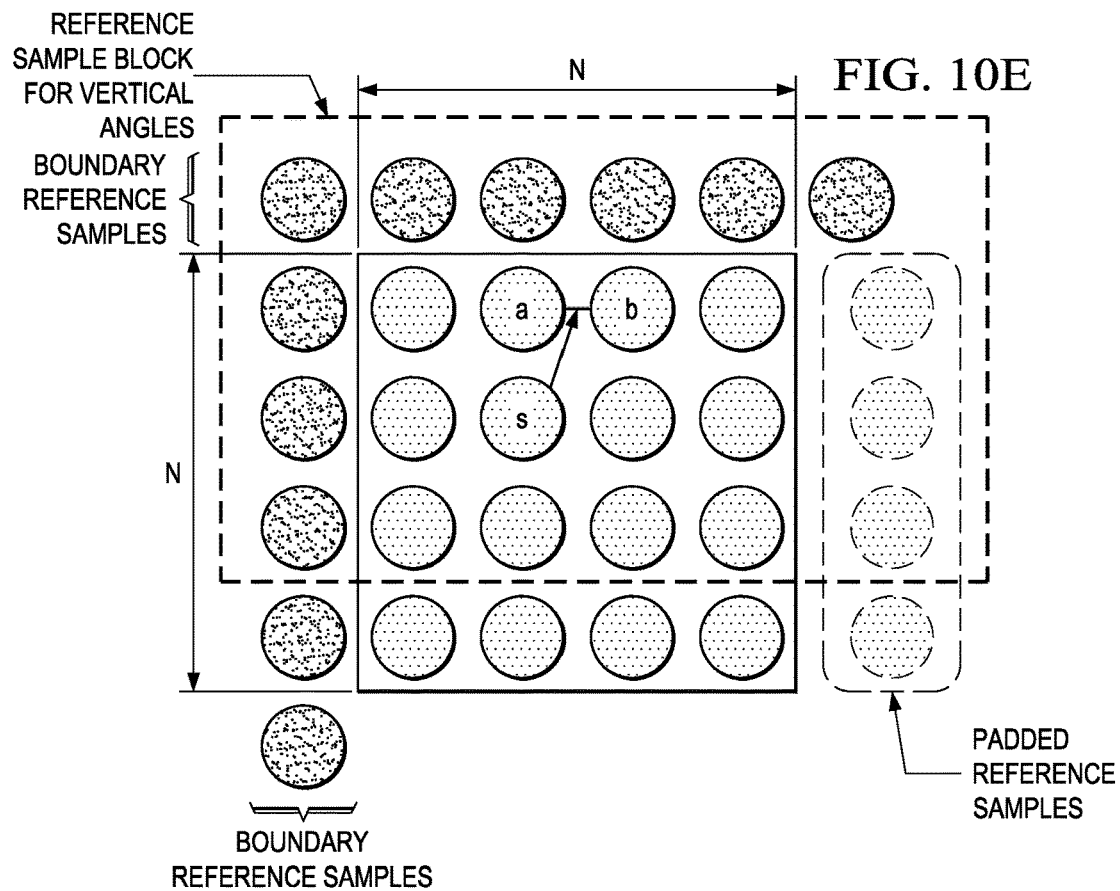
FIGS. 10E and 10F are examples illustrating reference sample blocks for, respectively, vertical and horizontal prediction angles.
Figure 10F:
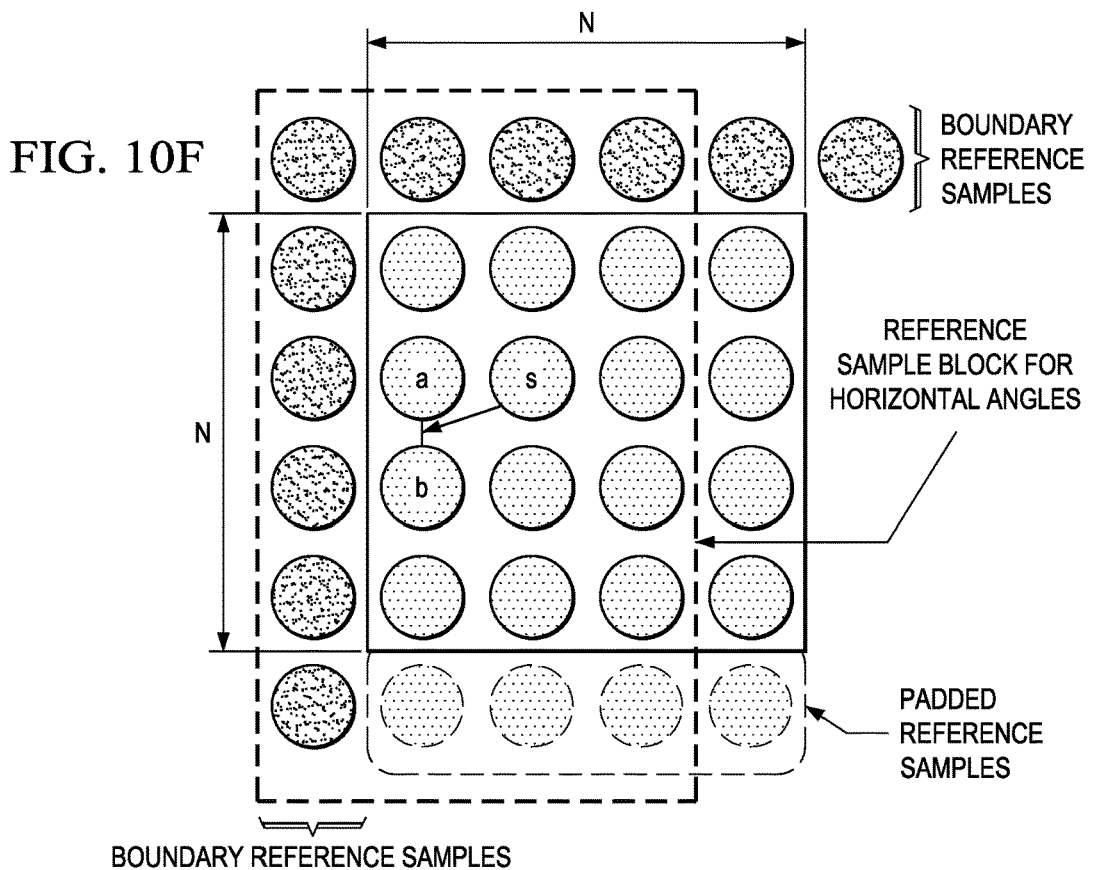

A block of reference samples r to be used for computing the predicted samples is also determined 802. The block of reference samples includes the samples of the PU, boundary reference samples from the top and left neighboring reconstructed PUs, and padded reference samples. The particular boundary and padded reference samples included in a reference sample block depends on the direction of the intra-prediction angle. Further, the block of reference samples is constructed such that a reference sample, including the boundary reference samples, may be accessed relative to the location $(x, y)$ of a sample s in the PU. Referring to the example of FIG. 10E, the dotted rectangle encloses the reference sample block for a vertical prediction angle. The size of this reference sample block is $(N+1) \times N$. Referring to the example of FIG. 10F, the dotted rectangle encloses the reference sample block for a horizontal prediction angle. The size of this reference sample block is $N \times (N+1)$.

If any of the boundary samples are not available, padded values are supplied for the unavailable boundary samples. For example, a padded value for an unavailable boundary sample may generated by replicating the value of the closest available boundary sample to the unavailable boundary sample. One suitable technique for padding of boundary samples is described in HEVC draft 8. Other suitable techniques may also be used. Each of the padded reference samples for the reference sample block (see FIGS. 10E and 10F) may be generated by replicating the sample value of the closest adjacent sample in the PU.

Figure 9A:
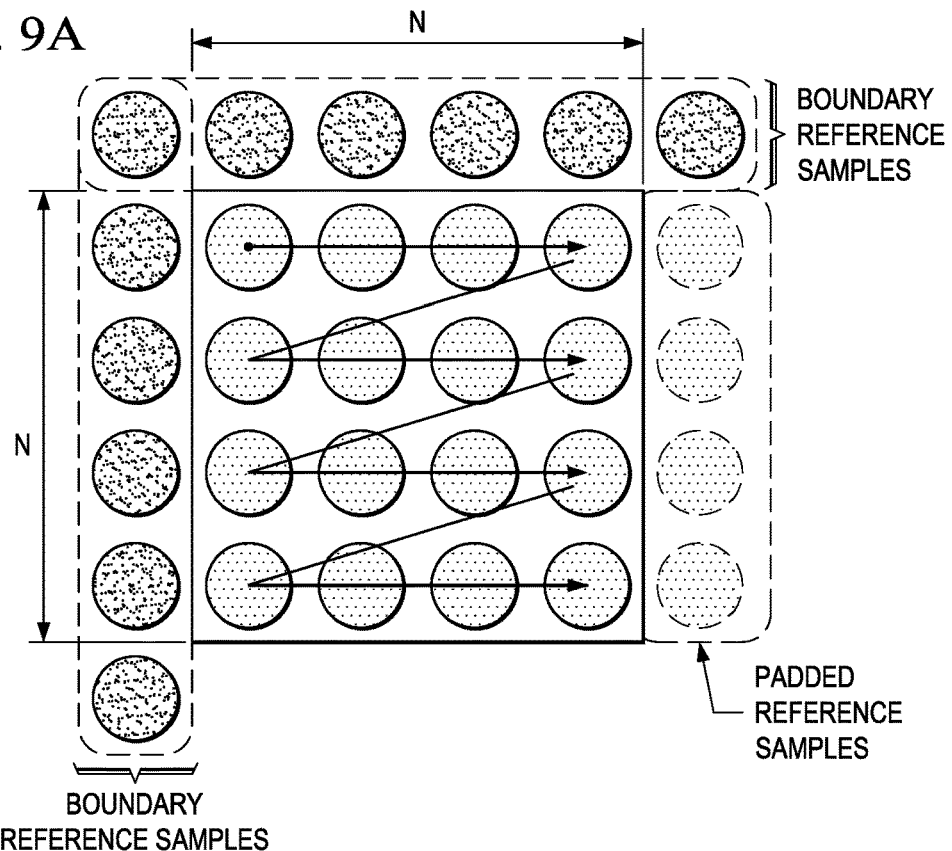
FIGS. 9A and 9B are examples illustrating scan orders for SAP.
Figure 9B:
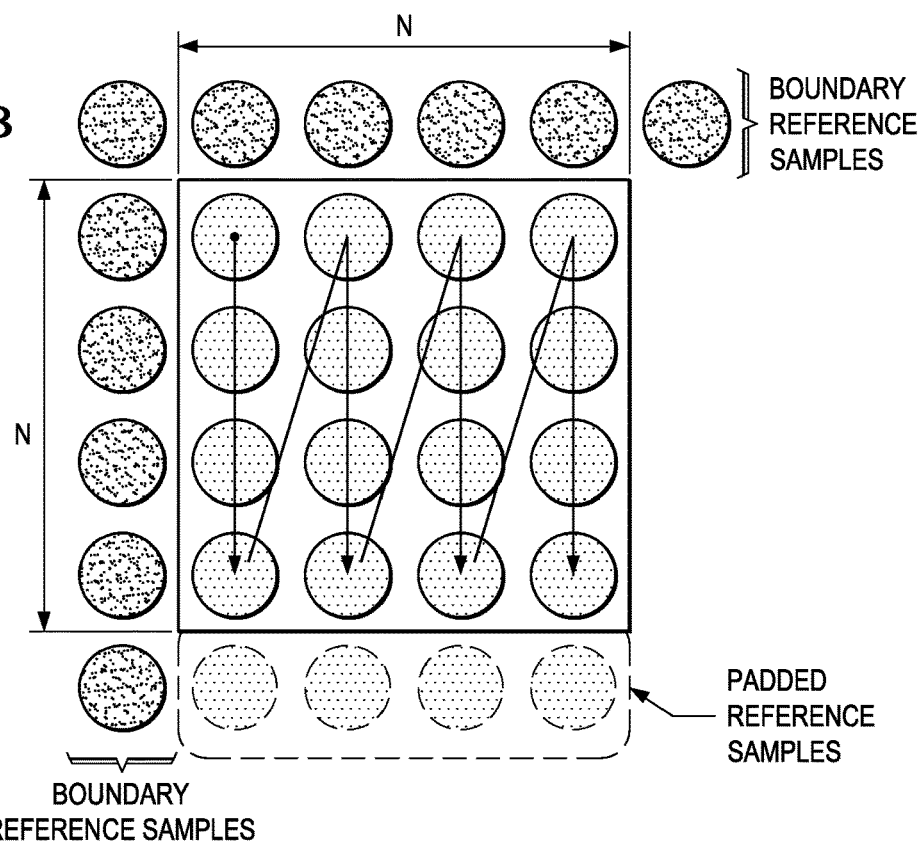

A block of predicted samples $p(x, y)$ is then generated 804-810 for the PU on a sample-by-sample basis. Each sample in the PU is selected 804 for generation of a predicted sample according to a scan order based on the direction (horizontal or vertical) of the intra-prediction angle to ensure availability of the needed adjacent reconstructed samples for the prediction sample computations in the decoder. As illustrated in FIG. 9A, if the intra-prediction angle is vertical, the samples are processed row by row, i.e., in raster scan order. As is illustrated in FIG. 9B, if the intra-prediction angle is horizontal, the samples are processed column by column.

The adjacent reference samples a and b for the current PU sample are determined 806 based on the intra-prediction angle and the location of the current sample. Let $s(x, y)$ be the current sample where the upper-left sample of the PU is $s(0, 0)$. If the intra-prediction angle is horizontal and negative (see FIG. 10B), the reference samples are $a=r(x-1, y-1)$ and $b=r(x-1, y)$. If the intra-prediction angle is horizontal and positive (see FIG. 10D), the reference samples are $a=r(x-1, y)$ and $b=r(x-1, y+1)$ if $y<N-1$ and $a=b=r(x-1, N-1)$ otherwise. If the intra-prediction angle is vertical and negative (see FIG. 10A), the reference samples are $a=r(x-1, y-1)$ and $b=r(x, y-1)$. If the intra-prediction angle is vertical and positive (see FIG. 10C), the reference samples are $a=r(x, y-1)$ and $b=r(x+1, y-1)$ if $x<N-1$ and $a=b=r(N-1, y-1)$ otherwise. Note that the right or bottom padded reference samples are generated by replicating the adjacent sample in the PU.

Once the reference samples a and b are determined, the prediction sample p is computed 808 by the linear interpolation of Eq. 1, where iFact=intraPredAngle & 31. Further, if iFact=0, p=a and if iFact=32, p=b. The prediction process is then repeated for the next PU sample, if any 810.

Referring now to FIG. 11, initially, an angular intra-prediction angle is determined 1100 for the PU. In a video decoder, the intra-prediction angle may be determined from the angular intra-prediction mode signaled for the PU in the compressed bit stream. For example, the intra-prediction block generation process may determine the angle corresponding to the signaled angular intra-prediction mode from a look up table such as that of Table 1.

A block of reference samples r to be used for computing the predicted samples is also determined 1102. The block of reference samples is determined as previously described in reference to FIG. 8 except that rather than including samples in the PU, the block of reference samples includes placeholder values for reconstructed samples of the PU. As was previously explained, PU samples adjacent to the PU sample being predicted may be reference samples for generating the predicted sample. When SAP is initiated in a decoder for a PU, the reconstructed PU samples are not available, thus placeholders are used for these samples in the reference sample block. As is explained below, these placeholders are replaced by corresponding reconstructed sample values after a predicted value for a reconstructed sample is computed. The scan order used to generate the prediction samples ensures that reconstructed samples are available in the block of reference samples before they are needed.

A block of predicted samples $p(x, y)$ is then generated 1104-1112 for each sample in the PU. Each sample in the PU is selected 1104 for generation of a predicted sample according to a scan order based on the direction (horizontal or vertical) of the intra-prediction angle to ensure availability of the needed adjacent reconstructed samples for the prediction sample computations in the decoder. As illustrated in FIG. 9A, if the intra-prediction angle is vertical, the samples are processed row by row, i.e., in raster scan order. As is illustrated in FIG. 9B, if the intra-prediction angle is horizontal, the samples are processed column by column.

The adjacent reference samples a and b for the current PU sample are determined 1106 based on the intra-prediction angle and the location of the current sample. The determination of adjacent samples is described above in reference to block 806 of FIG. 8. Once the reference samples a and b are determined, the predicted sample p is computed 1108 by the linear interpolation of Eq. 1, where iFact=intraPredAngle & 31. Further, if iFact=0, p=a and if iFact=32, p=b.

The block of reference samples is then updated 1110 with the reconstructed value of the current sample. More specifically, the value of the predicted sample is added to the decoded residual value of the current sample to generate the reconstructed value. This reconstructed value is then stored in the location of the block of reference samples corresponding to the current sample. The prediction process is then repeated for the next PU sample, if any 1112.

Figure 12:
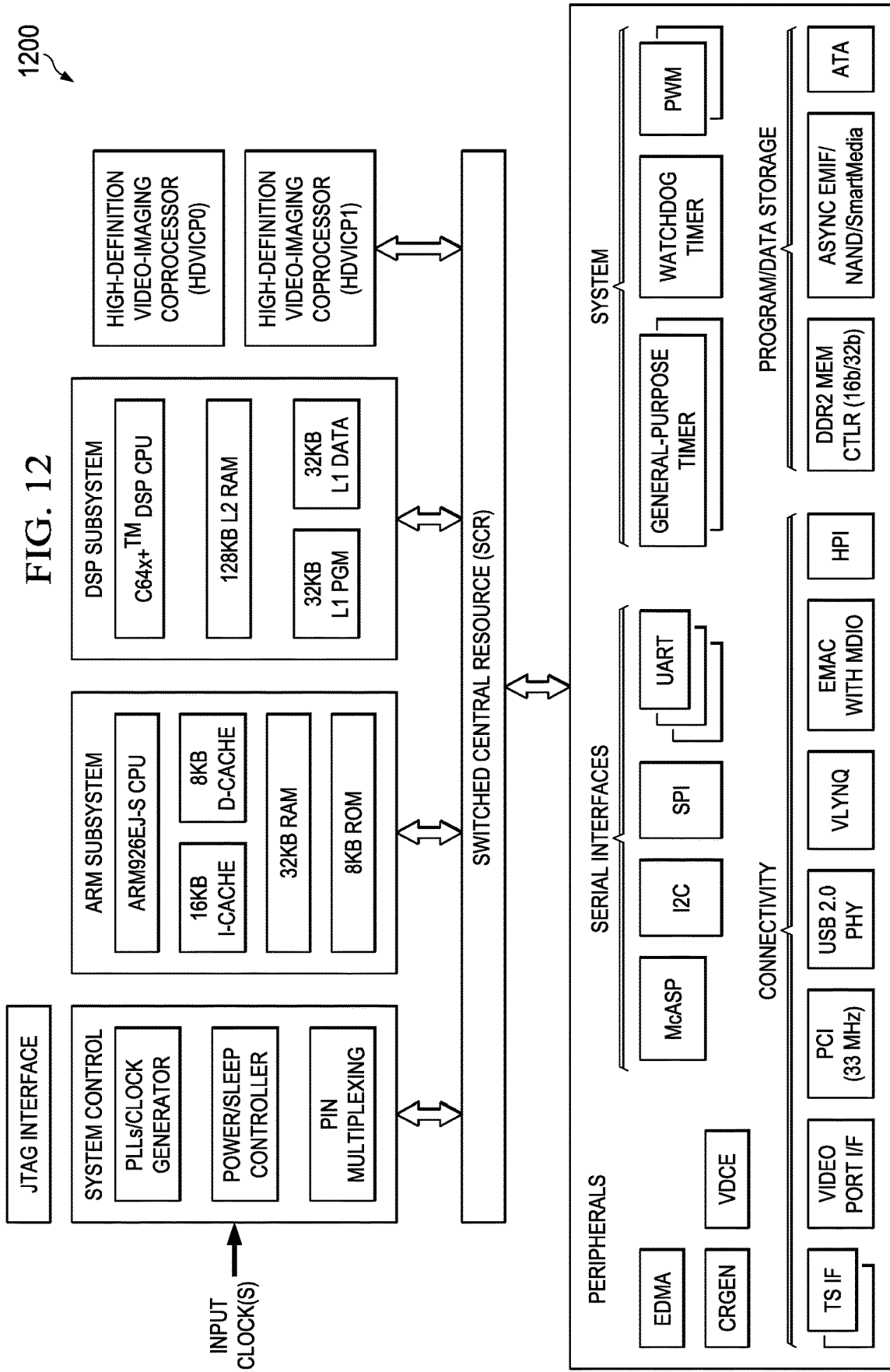
FIG. 12 is a block diagram of an illustrative digital system.

FIG. 12 is a block diagram of an example digital system suitable for use as an embedded system that may be configured to encode a video sequence and/or to decode a compressed video bit stream using sample-based angular intra-prediction as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1200 is a programmable platform designed to meet the processing needs of applications such as video encode/decode/transcode/transrate, video surveillance, video conferencing, set-top box, medical imaging, media server, gaming, digital signage, etc. The SoC 1200 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1200 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1200, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1200 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 12, the SoC 1200 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein using the angles and angular prediction modes of HEVC draft 8. However, any suitable number of angles/modes may be used. For example, the precision of the interpolation of the predicted sample may be higher, i.e., less than $\frac{1}{32}$, or lower, i.e., greater than $\frac{1}{32}$, thus respectively increasing or decreasing the number of angular intra-prediction modes/angles. The linear interpolation of the reference samples, as indicated by a prediction angle, used to generate a prediction sample is generically defined as $$p=((2^M-i\text{Fact})*a+i\text{Fact}*b+2^{M-1})>>M \qquad (4)$$

where M is the number of bits needed to represent the desired precision. For SAP, $i\text{Fact}=\text{intraPredAngle} \ \& \ (2^{M-1})$. For BAP, $i\text{Fact}=((y+1)*\text{intraPredAngle}) \ \& \ (2^{M-1})$ if the intra-prediction angle is vertical and $i\text{Fact}=((x+1)*\text{intraPredAngle}) \ \& \ (2^{M-1})$ if the intra-prediction angle is horizontal. Further, the number of angles/modes may be varied based on PU size.

In another example, embodiments have been described in which a lossless coding control component determines what areas of a picture should be losslessly encoded and the CU structure is adapted during the encoding process according to these areas. In some embodiments, rather than performing this analysis at the picture level, analysis can be performed at the CU level during the encoding process. For example, as CU/PU/TU structures are generated and tested, region of interest analysis may be performed on each CU to determine if a CU should be lossy or losslessly encoded.

In another example, other techniques for generating a padded reference sample than replicating the value of the adjacent sample in the PU may be used. For example, a padded reference sample may be generated by replicating the closest boundary reference sample or by interpolation of the closest boundary sample and the adjacent sample in the PU.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
    receiving, by a decoder, a compressed bit stream including prediction information;
    determining, by the decoder, an intra-prediction angle based on the prediction information;
    determining, by the decoder, a plurality of reference samples for a prediction unit (PU) based on the intra-prediction angle;
    determining, by the decoder, a predicted sample based on linear interpolation of at least two of the plurality of reference samples; and
    decoding, by the decoder, the PU based on the predicted sample.

2. The method of claim 1, wherein:
    the prediction information includes an angular intra-prediction mode.

3. The method of claim 2, wherein:
    the intra-prediction angle is determined from a look up table in a memory coupled to the decoder based on the angular intra-prediction mode.

4. The method of claim 1, wherein:
    the plurality of reference samples includes placeholder values for reconstructed samples of the PU; and
    each of the reconstructed samples of the PU includes a residual value of a current sample added to a value of the predicted sample.

5. The method of claim 4, further comprising:
    updating, by the decoder, the plurality of reference samples with the reconstructed samples.

6. The method of claim 1, wherein:
    the plurality of reference samples includes first samples of the PU, second boundary reference samples from top neighboring reconstructed PUs, third boundary reference samples from left neighboring reconstructed PUs, and fourth padded reference samples.

7. The method of claim 6, wherein:
    the second boundary reference samples, the third boundary reference samples, and the fourth padded reference samples are based on a direction of the intra-prediction angle.

8. The method of claim 1, wherein:
    the plurality of reference samples is configured to enable a reference sample to be accessed relative to a location of a current sample in the PU.

9. The method of claim 1, wherein:
    the intra-prediction angle is one of a horizontal prediction angle and a vertical prediction angle.

10. The method of claim 1, wherein:
    adjacent reference samples for the predicted sample are determined based on the intra-prediction angle and a location of a current sample.

11. An apparatus comprising:
    a receiver configured to receive an encoded video frame; and
    a video decoder coupled to the receiver, the video decoder configured to decode the encoded video frame, to produce a decoded video frame, the video decoder comprising:
        one or more processors; and
        a non-transitory computer readable storage medium storing a program for execution by the one or more processors, the programming including instructions to:
            determine an intra-prediction angle based on prediction information of the encoded video frame;
            determine a plurality of reference samples for a prediction unit (PU) based on the intra-prediction angle;
            determine a predicted sample based on linear interpolation of at least two of the plurality of reference samples; and
            decode the PU based on the predicted sample.

12. The apparatus of claim 11, wherein:
    the prediction information includes an angular intra-prediction mode.

13. The apparatus of claim 12, wherein:
    the intra-prediction angle is determined from a look up table in a memory coupled to the video decoder based on the angular intra-prediction mode.

14. The apparatus of claim 11, wherein:
    the plurality of reference samples includes placeholder values for reconstructed samples of the PU; and
    each of the reconstructed samples of the PU includes a residual value of a current sample added to a value of the predicted sample.

15. The apparatus of claim 14, wherein the programming further includes instructions to:
    update the plurality of reference samples with the reconstructed samples.

16. The apparatus of claim 11, wherein:
    the plurality of reference samples includes first samples of the PU, second boundary reference samples from top neighboring reconstructed PUs, third boundary reference samples from left neighboring reconstructed PUs, and fourth padded reference samples.

17. The apparatus of claim 16, wherein:
    the second boundary reference samples, the third boundary reference samples, and the fourth padded reference samples are based on a direction of the intra-prediction angle.

18. The apparatus of claim 11, wherein:
    the plurality of reference samples is configured to enable a reference sample to be accessed relative to a location of a current sample in the PU.

19. The apparatus of claim 11, wherein:
    the intra-prediction angle is one of a horizontal prediction angle and a vertical prediction angle.

20. The apparatus of claim 11, wherein:
    adjacent reference samples for the predicted sample are determined based on the intra-prediction angle and a location of a current sample.

* * * * *